United States Patent

Kobayashi et al.

[11] Patent Number: 5,575,636
[45] Date of Patent: Nov. 19, 1996

[54] POROUS NON-FOULING NOZZLE

[75] Inventors: Hisashi Kobayashi, Putman Valley; Steve L. Slader, Flushing; Zhiyou Du, Croton-on-Hudson; William J. Snyder, Ossining, all of N.Y.

[73] Assignee: Praxair Technology, Inc., Danbury, Conn.

[21] Appl. No.: 264,084

[22] Filed: Jun. 21, 1994

[51] Int. Cl.⁶ .............................. F23C 5/00; F23D 14/12
[52] U.S. Cl. .............................. 431/8; 431/328; 431/170; 126/92 AC; 126/92 R
[58] Field of Search .............................. 431/8, 328, 170; 126/92 AC, 92 R

[56] References Cited

U.S. PATENT DOCUMENTS

| | | | |
|---|---|---|---|
| 3,603,711 | 9/1971 | Downs | 431/352 |
| 4,673,349 | 6/1987 | Abe et al. | 431/328 |
| 4,711,627 | 12/1987 | Oeschsle et al. | 431/30 |
| 4,817,701 | 4/1989 | Stevens | 164/415 |
| 4,944,496 | 7/1990 | Thrower et al. | 266/220 |
| 5,209,656 | 5/1993 | Kobayashi et al. | 431/187 |
| 5,266,024 | 11/1993 | Anderson | 431/11 |
| 5,266,025 | 11/1993 | Francis, Jr. et al. | 431/187 |
| 5,267,850 | 12/1993 | Kobayashi et al. | 431/8 |

Primary Examiner—Larry Jones
Attorney, Agent, or Firm—Stanley Ktorides

[57] ABSTRACT

A nozzle and gas injection method using the nozzle wherein the nozzle comprises a section of porous material. Gas passes through one or more passageways running the length of the porous material section and also diffuses through the porous material section exiting across the nozzle face. This gas passing through the face serves to keep deleterious material, such as zone vapors, from contacting and fouling the nozzle.

15 Claims, 3 Drawing Sheets

POROUS NON-FOULING NOZZLE

TECHNICAL FIELD

This invention relates generally to nozzles and is particularly useful for the injection of high velocity gas into a combustion zone.

BACKGROUND ART

Recent advances in combustion technology have employed the use of high velocity gas injection into a combustion zone to carry out combustion with reduced nitrogen oxides ($NO_x$) generation. Nozzles with relatively small diameters are employed in order to achieve the high velocities. The high gas velocities cause furnace gases to be aspirated or entrained into the high velocity gas which has a dampening effect on $NO_x$ generation.

A problem with high velocity gas injection into a combustion zone is that material within the combustion zone, which may comprise particulate matter and condensable vapors, causes the nozzles, which have small openings to begin with, to foul or corrode as the combustion zone material contacts the nozzle. The furnace gases also tend to be quite hot, on the order of 1000° F. or more, which exacerbates the fouling and corrosion problem. This problem becomes particularly severe when the furnace temperature exceeds 2200° F. The fouling causes the jets issuing from the nozzles to be redirected, creating poor heat delivery to the charge and also requiting frequent maintenance which is costly and interrupts furnace production.

One way of dealing with this problem has been to provide a large amount of water cooling to the nozzle so as to prevent high temperature corrosion or melting. However, a water cooling system is complex to operate and does not address the fouling problem where the furnace atmosphere has a high particulate content. Moreover, water cooling can escalate the corrosion and fouling problems when the furnace atmosphere contains condensable vapors.

It is known that temperature effects on a nozzle may be ameliorated by recessing the nozzle in a cavity communicating with a combustion zone. However, a relatively large recess is required to achieve a significant beneficial effect. With high velocity gas injection, such a large recess may be detrimental because a large amount of corrosive furnace gas may be drawn into the cavity. Furthermore, this results in a reduction in the gas jet velocity. Thus, while the nozzle avoids temperature induced damage, this is offset by increased damage caused by contact with corrosive furnace gas drawn into the cavity.

It is known that nozzle fouling may be reduced by providing an annular flow of gas at the nozzle face. The annular gas flow serves to block furnace gases and particulate matter from contacting the nozzle, particularly when the nozzle is recessed in a cavity communicating with the main combustion zone. However, such an arrangement is very sensitive to nozzle concentricity. For example, small changes caused by nozzle movement, an imperfectly centered nozzle, uneven refractory wear or material buildup in a burner port or cavity will significantly alter the annular gas flow and may result in poor nozzle protection.

Accordingly, it is an object of this invention to provide a nozzle which may be employed in a gas injection system and which will enable effective gas injection with reduced fouling caused, for example, by the contact with combustion zone material with the nozzle.

It is another object of this invention to provide a method for injecting gas into a receiving zone such as a combustion zone while reducing the amount of nozzle fouling caused by, for example, combustion zone material.

SUMMARY OF THE INVENTION

The above and other objects, which will become apparent to one skilled in the art upon a reading of this disclosure, are attained by the present invention, one aspect of which is:

A nozzle comprising a front section having a length and a face, a back section suitable for receiving gas, at least one passageway suitable for the passage of a first portion of said gas through the length, and said front section comprising porous material which enables a second portion of said gas to pass through the porous material and out from the nozzle across the face.

Another aspect of the invention is:

A method for injecting gas into a receiving zone comprising:

(A) providing a nozzle comprising a section having a length and a face, a passageway through the length, and said section comprising porous material;

(B) passing gas through the passageway and into the receiving zone; and (C) passing gas through said porous material and into the receiving zone at the face.

As used herein the term "furnace gases" means gases which are typically found within a furnace such as carbon dioxide, carbon monoxide, water vapor, nitrogen, oxygen and unburned fuel, and condensable vapors such as sodium species and acid vapors.

As used herein the term "combustion zone material" means material in a furnace which is transportable by fluid such as furnace gases and particulate matter. Examples of particulate matter are glass batch materials and ash from coal combustion.

As used herein the term "combustion zone" means a volume which contains combustion zone material and within at least a portion of which combustion is carried out.

DETAILED DESCRIPTION

The invention will be described in detail with reference to the Drawings.

Figure 1:
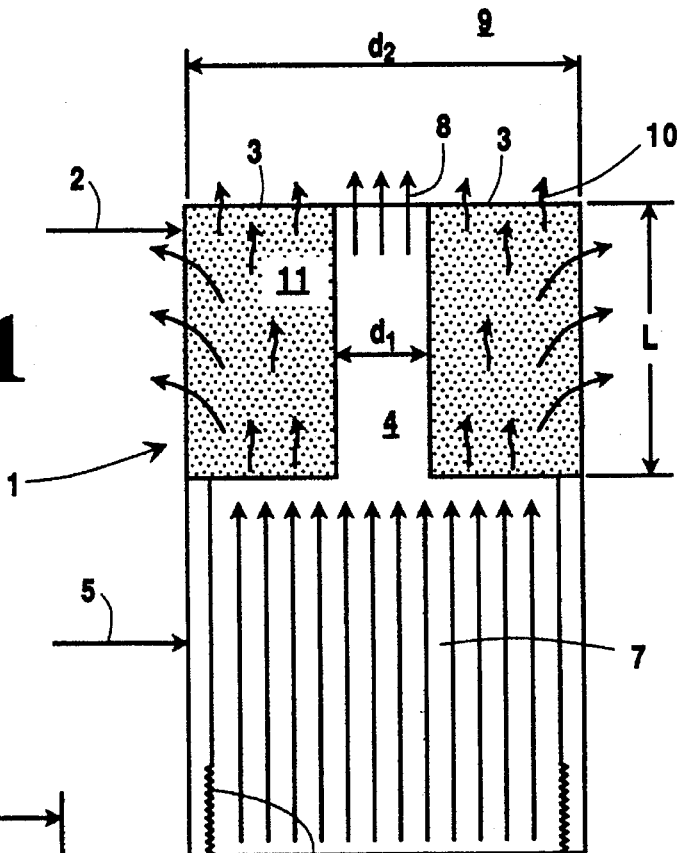
FIG. 1 is a cross-sectional representation of one preferred embodiment of the nozzle of this invention.

Referring now to FIG. 1, nozzle 1 comprises a front section 2 having a length L and a face 3. Nozzle 1 may have a cylindrical shape or any other effective shape such as a shape having an elliptical cross-section. At least one passageway 4 passes through the length of nozzle tip or front section 2. Generally the passageways are cylindrical in shape. Preferably the invention will employ one passageway 4 although the invention may employ a plurality of passageways 4 such as from 2 to 8 passageways.

Section 2 comprises porous material 11. As used herein the term "porous material" means a material containing connected pores allowing a gas flow therethrough, including materials made of sintered particles and honeycomb-like structures containing parallel straight channels.

The porous material will generally be porous ceramic or porous, e.g. sintered, metal, or honeycomb-like materials. Examples of porous material which may be employed in the practice of this invention include partially stabilized zirconia, partially stabilized alumina and zirconia, cordierite, mullite, phosphate-bonded alumina, magnesia, sintered aluminum, sintered silicon carbide, sintered brass, sintered bronze, and sintered stainless steel.

Passageway 4 has a diameter $d_1$, which is generally within the range of from 1/16 inch to 10 inches. When more than one passageway is employed, $d_1$ refers to the equivalent diameter of a single passageway which has the same cross-sectional area as the sum of the areas of all such passageways. Nozzle face 3 has a diameter $d_2$. Generally the ratio $d_1/d_2$ will be within the range of from 0.05 to 0.8. By altering the ratio of $d_1$ to $d_2$ one can alter the percentage of the total gas which passes through the porous material.

Nozzle 1 also includes base or back section 5 which is generally made of metal such as stainless steel. Back section 5 is suitable for receiving gas. Back section 5 joins with a gas source. Typically this joining is carried out by means of screw threads 6. The nozzle may be positioned within the interior of a receiving zone such as a combustion zone, flush with the combustion zone wall, recessed in a port, or secured in a port which communicates with the receiving or combustion zone. For purposes of this invention, in these latter cases the port is considered to be part of the receiving or combustion zone.

In operation, gas is passed into the nozzle back section from a gas source such as is indicated by arrows 7. The gas may be fuel or oxidant. The oxidant may be air or a fluid having an oxygen concentration exceeding that of air such as commercially available pure oxygen. Examples of fuel include methane, propane and hydrogen.

The invention may be used to inject other gases. For example, the invention may be used to inject nitrogen or argon or carbon dioxide, such as into an environment for inerting or blanketing or heat treating purposes.

A first portion of the gas which enters the nozzle back section passes through the nozzle front section through passageway(s) 4 and a second portion of the gas which enters the nozzle back section passes through the porous material of front section 2. Typically, from 15 to 98 percent of the gas which passes through the nozzle will pass through the passageway(s) 4 and from 2 to 85 percent of the gas will pass through the porous material. Preferably from 10 to 65 percent of the gas will pass through the porous material. The flowrate of the gas passing through the porous material section will generally be within the range of from 10 to 100,000 standard cubic feet per hour (scfh). It is expected that the invention will find its greatest utility for use in injecting gas into a combustion zone and it is in this context that the operation of the invention will be discussed in greater detail.

The gas which passes through passageway(s) 4 then passes, as indicated by arrows 8, into combustion zone 9 at a velocity generally greater than 100 feet per second (fps) although any effective velocity may be employed. The remaining gas passes through the porous material of front section 2, as indicated by the arrows, and at least a portion of this remaining gas passes out from nozzle 1 across face 3 as indicated by arrows 10. In the embodiment of the invention illustrated in FIG. 1, some of this remaining gas passes out from the nozzle through the sides of the porous section.

The gas which passes through the porous material and into the combustion zone serves to keep combustion zone material from fouling the nozzle. The nozzle could be fouled, for example, by having the passageway 4 plugged, at least in significant part, by the condensation of condensable vapors or the buildup of particulate matter. Other examples of fouling include corrosion or other deterioration caused by hot or otherwise deleterious combustion zone material.

Figure 3:
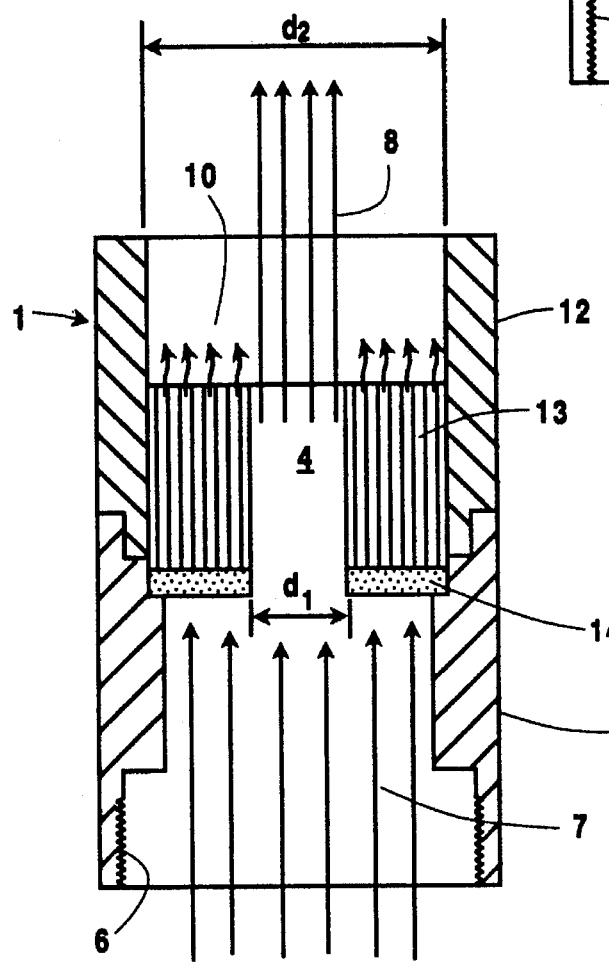
FIG. 3 is another cross-sectional representation of a preferred embodiment of the invention employing two different types of porous material.
Figure 2:
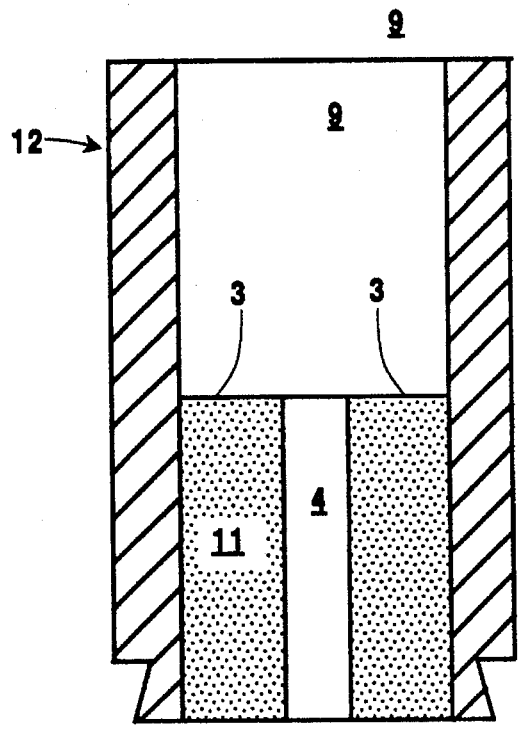
FIG. 2 is another cross-sectional representation of a preferred embodiment of the invention wherein the porous material is encased in a non-porous material.
Figure 4:
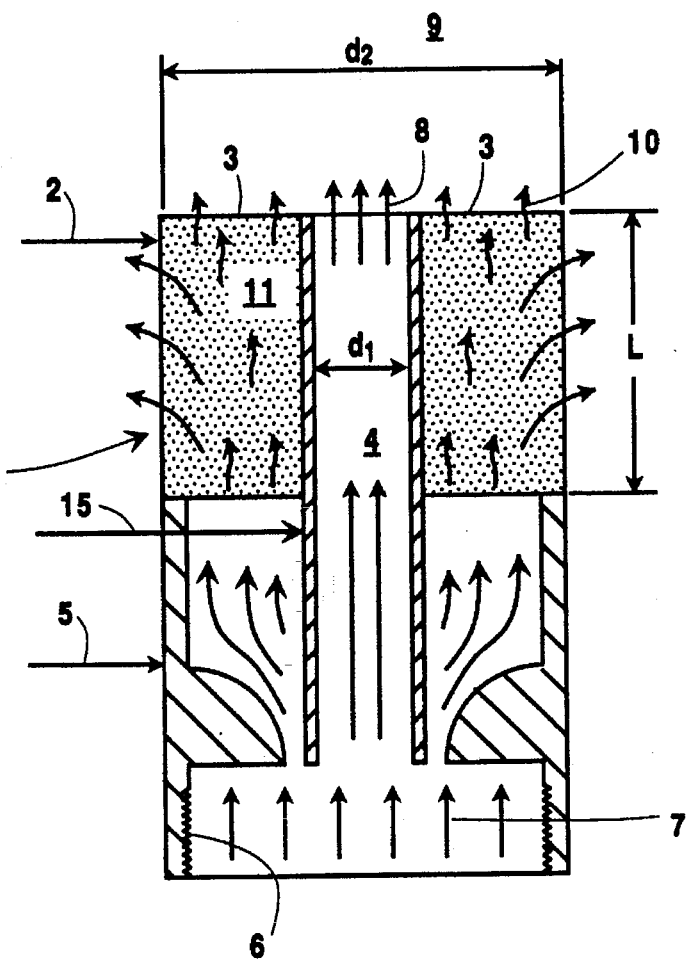
FIG. 4 is another cross-sectional representation of a preferred embodiment of the invention employing a pipe for gas flow direction control.

FIGS. 2–4 illustrate other embodiments of the invention. The numerals in the Figures are the same for the common elements and these common elements will not be discussed again in detail.

Referring now to FIG. 2, there is illustrated another embodiment of the tip or front section of the nozzle of this invention. In this embodiment the porous material 11 is encased along the length and recessed in a casing 12 of solid material such as conventional solid alumina-zirconia-silica (AZS) refractory. This encased embodiment is useful when the porous material does not have the mechanical strength to withstand certain especially harsh environments to which it may be subjected.

FIG. 3 illustrates an embodiment of the invention similar to that illustrated in FIG. 2 in that the porous section is encased, at least in part, by solid material 12. The embodiment illustrated in FIG. 3 employs two different porous materials, monolithic ceramic 13 and porous sintered stainless steel 14. A monolithic ceramic is like a bundle of straws packed closely together. Thus the gas flow is constrained in a single direction. With the porous ceramic the gas may flow in almost any direction provided there is nothing which impedes the flow.

FIG. 4 illustrates an embodiment of the invention similar to that illustrated in FIG. 1. This embodiment further includes a pipe 15 which extends beyond passageway 4 into the nozzle base or back section 5. By use of center pipe 15 one can control the split of the gas flow between the central passageway 4 and the porous material without changing the dimensions of the porous material tip section of the nozzle or changing the permeability of the tip section.

This invention provides a means for adequately preventing the accumulation of condensables onto the tip of the nozzle, and so prevents it from fouling or plugging. It achieves this by passing a fraction of the process gas through the nozzle face. For a given gas flow rate, the fraction going through the passageway(s) and that passing through the porous section are not independent of each other. Both flows can be determined based on the ratio of the porous nozzle area to the area of the passageway(s). The greater the flow through the porous material, the better the protection of the nozzle. The momentum-averaged velocity of the gas issuing from the nozzle can be optimized to achieve a low $NO_x$ emission. For a given gas flow rate and given nozzle dimensions, the porous nozzle can maximize momentum-averaged velocity at a specific ratio of $d_1$ to $d_2$. The fact that a gas flow from the porous nozzle itself is used to prevent plugging or fouling of the nozzle, and that the degree of purging or protection achievable can be incorporated into the design of the nozzle is an important advantage of this invention.

Although the porous nozzle of this invention is designed primarily to prevent nozzle fouling as part of the burner system, it has other attributes. For example, it produces low $NO_x$ during operation; it requires no water cooling; it does not require very high pressure to flow the gas; and it is fairly simple to construct.

As previously discussed, a major problem with conventional nozzles is the high degree of fouling resulting from only a small amount of eccentricity when the nozzle is employed in a furnace port. The following examples and comparative examples serve to demonstrate the effectiveness of the invention in overcoming this problem. The results are shown graphically in FIG. 5 which also illustrates an example of eccentricity (e). The examples are presented for illustrative purposes and are not intended to be limiting.

A nozzle similar to that illustrated in FIG. 4 except without center pipe 15 was employed in testing wherein it was positioned in a tube having a diameter of 2.125 inches at a recess of one tube diameter and used to inject nitrogen gas from the tube into the atmosphere. The concentration of oxygen at the nozzle face was measured and used to indicate how well the nozzle can keep ambient gases, e.g. generally furnace gases but air in these tests, from the nozzle face. The lower the oxygen concentration the more effective was the nozzle in maintaining the face purged of outside gases. The nozzle had an outer diameter of 1.875 inches and a front section length of 1.0 inch. It had one central passageway having a diameter of 0.5 inch. The porous section was comprised of monolithic cordierite having a pore size of about 1 millimeter. Nitrogen gas at a flowrate of 1000 scfh passed into the nozzle. About 40 percent of this gas passed through the central passageway and about 60 percent passed through the pores of the porous section. The gas passed through the central passageway at a velocity of 80 fps. In addition, an annular flow of nitrogen gas at a flowrate of 165 scfh passed through the annulus between the nozzle and the tube inner wall. Oxygen concentration readings were taken with the nozzle centered within the tube and at four off-center positions and the results are shown in FIG. 5 as line A.

A similar procedure was carried out except that the nozzle included a center pipe such as pipe 15 shown in FIG. 4. In this case about 50 percent of the gas flowed through the central passageway and about 50 percent flowed through the porous section. The velocity of the gas passing through the central passageway was 140 fps. The results are shown in FIG. 5 as line B.

For comparative purposes a similar procedure was carried out without using the invention. That is, the nozzle comprised a conventional solid section rather than the porous section of the invention. The velocity of the gas passing through the central passageway was 204 fps. The annular flow of nitrogen was increased to 965 scfh, i.e., about six times that in the example of the invention, in order to achieve an adequate level of purging. The results are shown in FIG. 5 as line C.

Figure 5:
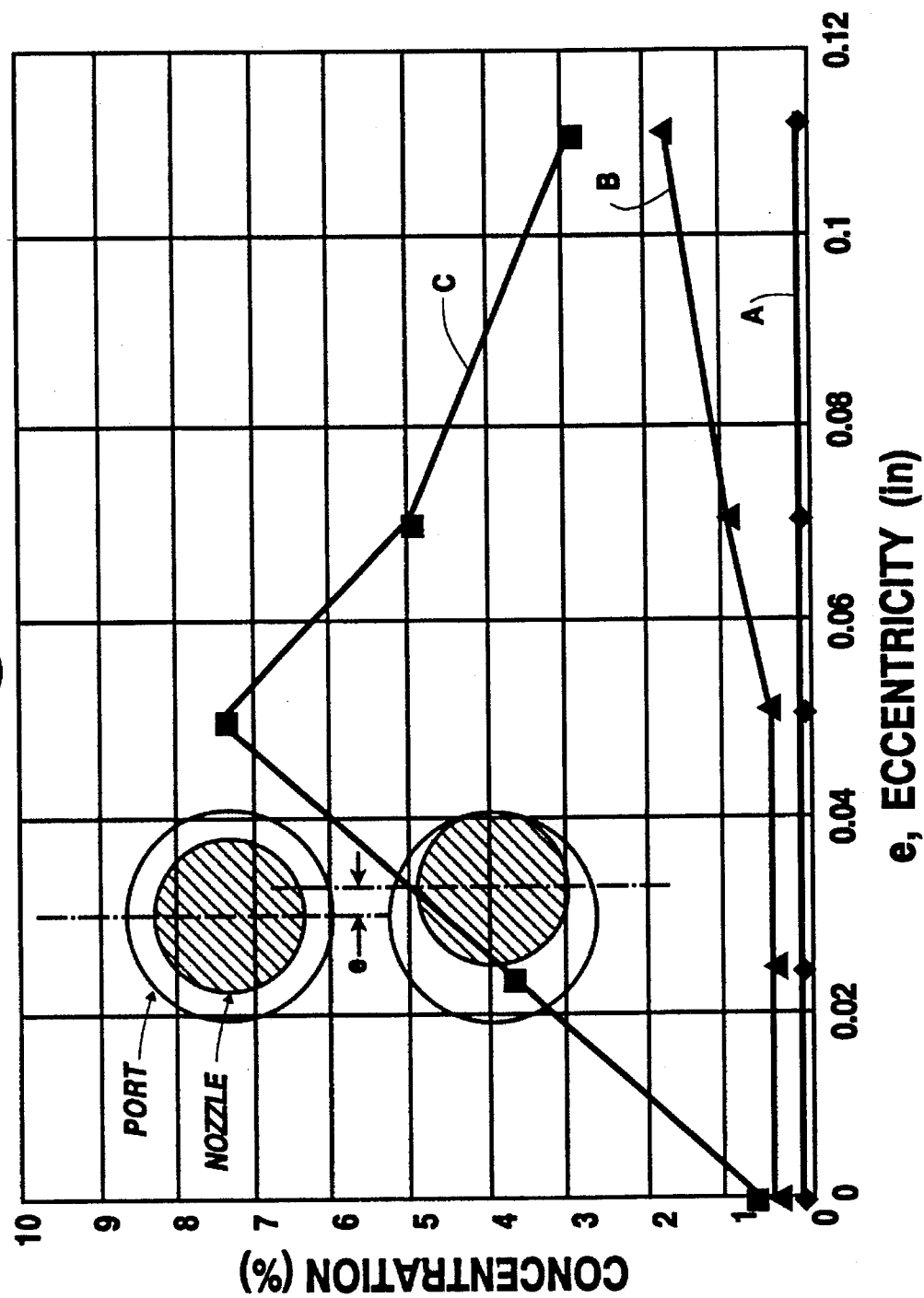
FIG. 5 is a graphical representation of the improved results obtained with the invention compared with results obtained with a conventional nozzle.

As is clearly demonstrated by the results illustrated in the FIG. 5, the invention effectively solves the problem of high furnace gas presence at the nozzle face when the nozzle is recessed in a burner port and perfectly symmetrical flow conditions do not exist.

Although the invention has been described in detail with reference to certain preferred embodiments, those skilled in the art will recognize that there are other embodiments of the invention within the spirit and the scope of the claims.

We claim:

1. A nozzle comprising a front section having a length and a face, a back section joining with a source of a gas from the group consisting of fuel, oxidant, nitrogen, argon and carbon dioxide, at least one passageway suitable for the passage of a first portion of said gas through the length at a velocity greater than 100 feet per second, and said front section comprising porous material which enables a second portion of said gas to pass through the porous material and out from the nozzle across the face.

2. The nozzle of claim 1 wherein the porous material is encased by non-porous material along the length.

3. The nozzle of claim 1 wherein the porous material comprises ceramic.

4. The nozzle of claim 1 wherein the porous material comprises metal.

5. The nozzle of claim 1 wherein the ratio of the diameter of the passageway(s) to the diameter of the face is within the range of from 0.05 to 0.8.

6. The nozzle of claim 1 wherein the porous material comprises monolithic ceramic.

7. The nozzle of claim 1 wherein the porous material comprises monolithic ceramic and sintered metal.

8. The nozzle of claim 1 having a single passageway and further comprising a pipe extending along said passageway through the front section and into the back section.

9. A method for injecting gas into a receiving zone comprising:

(A) providing a nozzle comprising a section having a length and a face, a passageway through the length, and said section comprising porous material, (B) passing a portion of a gas from the group consisting of fuel, oxidant, nitrogen, argon and carbon dioxide through the passageway and into the receiving zone at a velocity greater than 100 feet per second; and (C) passing another portion of said gas through said porous material and into the receiving zone at the face.

10. The method of claim 9 wherein the receiving zone is a combustion zone.

11. The method of claim 9 wherein from 10 to 65 percent of the total gas passing into the receiving zone from the nozzle passes through the porous material.

12. The method of claim 9 wherein gas additionally passes out from the porous material along the length of the section of porous material.

13. The method of claim 9 wherein from 2 to 85 percent of the total gas passing into the receiving zone from the nozzle passes through the porous material.

14. The method of claim 9 wherein the flowrate of the gas passing through the porous material is within the range of from 10 to 100,000 standard cubic feet per hour.

15. A nozzle comprising a front section having a length and a face, a back section joining with a source of a gas from the group consisting of fuel, oxidant, nitrogen, argon and carbon dioxide, a single passageway suitable for the passage of a first portion of said gas through the length at a velocity greater than 100 feet per second, and said front section comprising porous material which enables a second portion of said gas to pass through the porous material and out from the nozzle across the face.

* * * * *